Nov. 22, 1955  E. F. STOVER  2,724,405
RATE OF FLOW CONTROLLERS
Filed Jan. 22, 1951  2 Sheets-Sheet 1
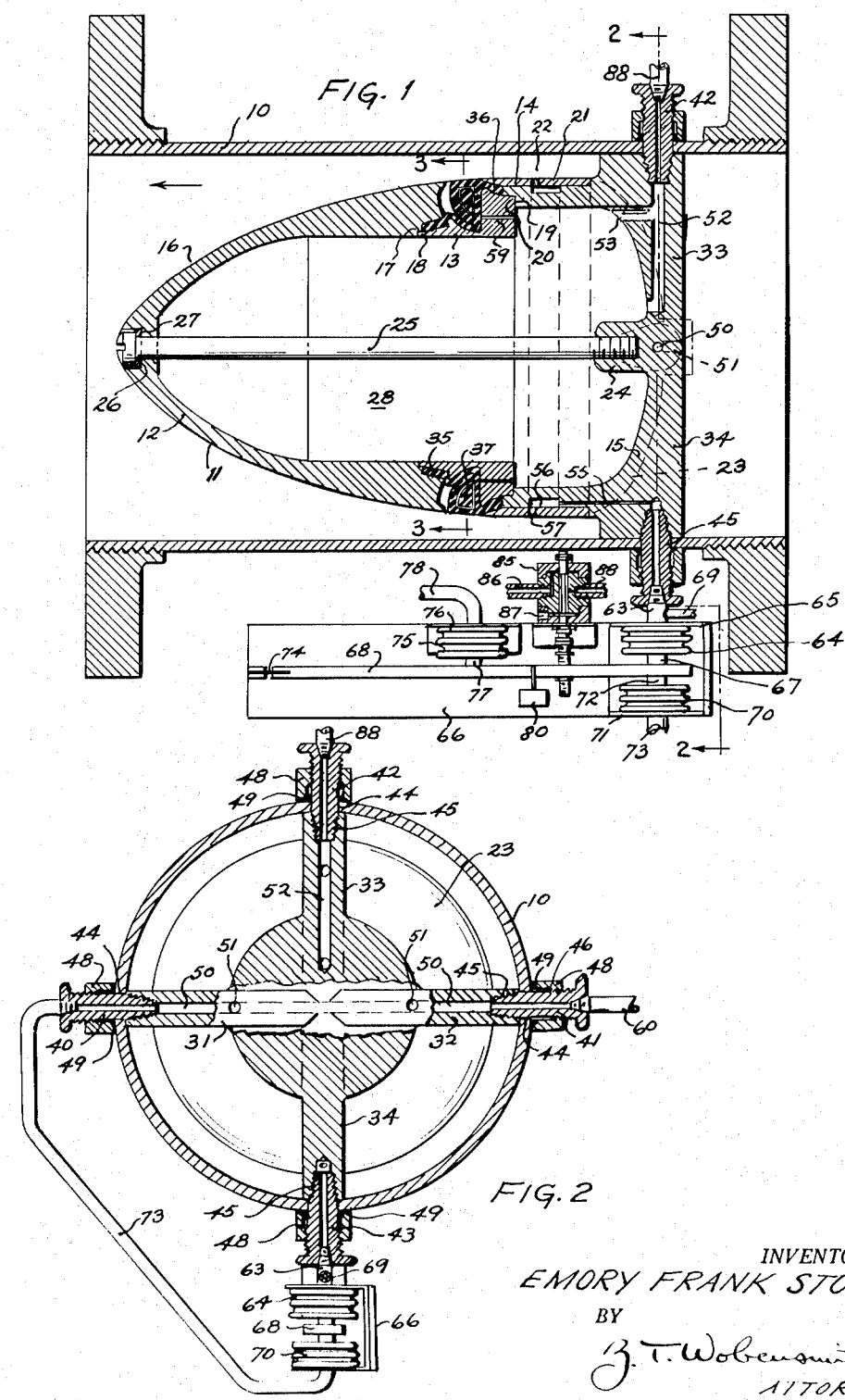
INVENTOR.
EMORY FRANK STOVER
BY
B. T. Wobensmith
ATTORNEY Nov. 22, 1955     E. F. STOVER     2,724,405
RATE OF FLOW CONTROLLERS Filed Jan. 22, 1951     2 Sheets—Sheet 2

INVENTOR.
EMORY FRANK STOVER
BY
ATTORNEY

United States Patent Office 2,724,405
Patented Nov. 22, 1955

2,724,405

RATE OF FLOW CONTROLLERS

Emory Frank Stover, Wynnewood, Pa.

Application January 22, 1951, Serial No. 207,121

16 Claims. (Cl. 137—486)

In my prior application for patent filed February 18, 1949, Serial No. 77,125, now abandoned, there is shown a rate of flow controller which includes a radially expansible ring or tube for controlling the flow.

The present application, which is in part a continuation of the prior application referred to, also relates to rate of flow controllers, for maintaining a predetermined rate of flow through a fluid conduit, and includes improvements in structure by which smoother and more stable control can be effected.

In accordance with the present invention, a rate of flow controller, particularly for liquids, is provided in which the quantity of liquid being supplied is continuously measured and provisions are made for varying the rate of flow, upon a departure from the prescribed rate, to maintain the flow constant.

In accordance with the present invention, a rate of flow controller is provided which is particularly suitable for controlling the flow of water through rapid sand filters in water treatment plants and for maintaining the desired rate of flow with variable and increasing resistance to the flow.

It is a further object of the present invention to provide an improved rate of flow controller embodying in a unitary construction a measuring element and a flow regulating valve.

In accordance with the present invention, also, a rate of flow controller is provided having an improved flow controller element or regulating valve embodied therein.

In accordance with the present invention, also, a rate of flow controller is provided employing an elastic member for throttling, which, by virtue of its construction and its geometric form, will give smooth and stable control at any and all settings.

Other objects and advantageous features of the present invention will be apparent from the specification and claims.

The nature and characteristic features of the invention will be more readily understood from the following description, taken in connection with the accompanying drawings forming part hereof, in which:

Figure 1 is a central sectional view through a preferred embodiment of a controller in accordance with the present invention;

Fig. 2 is a transverse sectional view taken approximately on the line 2—2 of Fig. 1;

Figure 4:
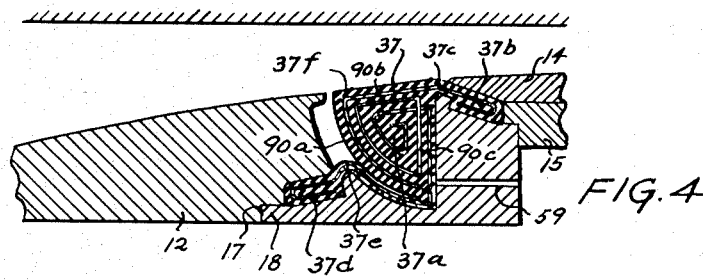
Figure 5:
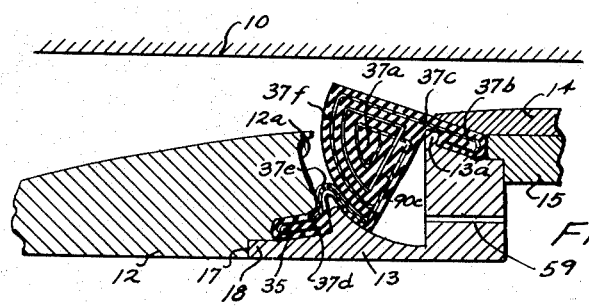
Figure 6:
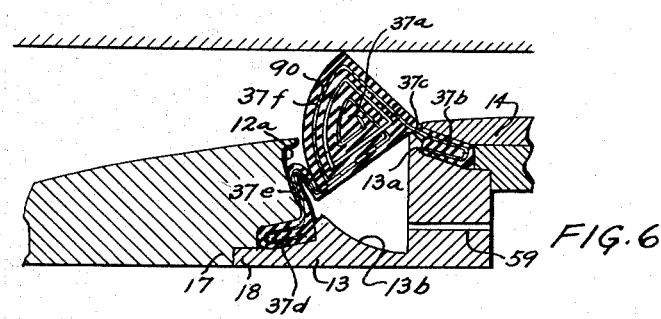
Figure 3:
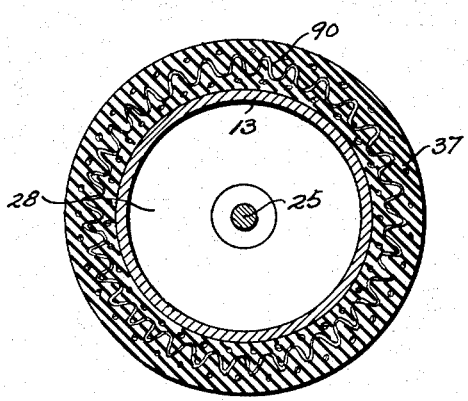
Fig. 3 is a sectional view taken approximately on line 3—3 of Fig. 1.

Figs. 4, 5, and 6 are enlarged fragmentary sectional views showing different positions of the elastic valve or throttling member employed in connection with the controller.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, a pipe section 10 of substantially uniform internal bore is illustrated, preferably made of brass or other material resistant to corrosive action of the fluid employed. The pipe section 10 is adapted to be inserted in the pipe or the conduit (not shown) through which the flow is to be controlled.

Inserted within the pipe section 10, and axially centered therein, a body 11 is provided, of suitable exterior shape as hereinafter explained, and preferably consisting of a hollow rear end portion 12, a hollow intermediate mounting portion 13, another intermediate portion or ring 14 and a hollow front end portion 15.

The rear end portion 12 has a curved exterior surface 16, and an interior groove 17 for engagement by a complemental rim 18 on the mounting portion 13. The front end portion 15 has an interior groove 19 for engagement by a rim 20 on the mounting portion 13. The intermediate portion 14 is preferably seated on the exterior of the end portion 15 and has an interior surface 21 which is adapted to provide, with the interior surface of the pipe section 10, a venturi throat 22. The end portion 15 has an exterior surface 23 for directing the fluid to the throat 22 as hereinafter explained.

The end portion 15 has an interior boss 24 for the reception of the threaded end of a clamping bolt 25 which is axially disposed and retains the body portions 12, 13, and 15, in assembled relationship. A lead washer 26 may be inserted between the head of the bolt 25 and a socket 27 in the body portion 12 to form a seal.

The body 11 is hollow and the interior provides a fluid chamber or compartment 28, for purposes to be explained.

The body 11 is preferably supported within the pipe section 10 by intersecting ribs 31, 32, 33, and 34, diametrically disposed in the pipe section 10 and connected or formed integral with the body portion 15. The ribs 31 and 32 are preferably alined and the ribs 33 and 34 are preferably alined.

Between the body portion 12 and the body portion 13, a groove 35 is provided and at the junction of the body portions 13, 14, and 15, a similar groove or recess 36 is provided.

A circumferentially disposed ring 37 of elastic material, such a rubber, natural or synthetic, is provided. The ring 37 has a central section 37a of quadrant shape in cross section with an upstream beaded edge 37b connected thereto by an annular part 37c and with a downstream beaded edge 37d connected thereto by a connecting portion 37e.

The ring 37 is adapted to be stretched and the beaded edge 37b engaged in the groove 36, with the beaded edge 37d disposed in the groove 35.

The mounting portion 13 has an outwardly extending rim 13a which by its engagement with the inner face of the annular part 37c aids in holding the edge 37b in the groove 36.

The body portion 12 and the mounting portion 13 have curved faces 12a and 13b, respectively, for the accommodation of the connecting portion 37e in whatever position this may be disposed.

In order to control the outward expansion of the elastic ring 37 while at the same time preventing stretching thereof in the direction of the fluid flow which tends to set up vibrations in that direction, an internal reinforcement 37f, in the form of strong cords, is imbedded in the elastic material of which the ring 37 is made in such fashion as to have the length of the cords in planes of the ring 37 taken radially and axially through the longitudinal axis of the pipe 10.

In order that the circumference of the elastic ring 37 may be increased, to shut off the flow passage as hereinafter explained, the elastic material of which the ring is made must be able to stretch in a circumferential direction, that is at ninety degrees to the planes in which the reinforcing cords 37f lie. Furthermore, the quadrant shaped portion 37a of the elastic ring 37 must be reinforced sufficiently so that it retains its shape while it is being stretched outwardly in a circumferential direction. The reinforcing, as heretofore described, permits of the desired expansion and contraction of the ring 37.

The ring 37 may also, if desired, have molded in the central section 37a thereof, a spring 90, each convolution of which respectively has three parts 90a, 90b and 90c complemental to and spaced inwardly from the outer surfaces of the central section 37a. This spring 90 by reason of its shape and disposition will permit of the circumferential expansion of the ring 37 as required, and without interference with the reinforcing cords 37f.

The mounting of the ring 37 as heretofore pointed out permits all axial sections of the central section 37a to rotate about the free portion of the upstream beaded edge 37b and the connecting portion 37e rolls from the toroidal surface of the central section 37a onto the toroidal surface 12a of the body portion 12, thus maintaining fluid tightness but allowing ample motion for ring 37 to swing against the interior wall of the pipe 10 and shut off the flow.

Alined with the ends of the ribs 31, 32, 33 and 34, nipples 40, 41, 42 and 43 are provided extending radially inwardly through suitable holes 44 in the pipe section 10 and into engagement with the outer ends of the ribs.

The nipples 40, 41, 42, and 43 are preferably each secured at their inner ends by pipe threads 45 to provide fluid tight joints at these locations and externally of the pipe 10 are provided with straight helical threads 46 for the reception of internally threaded sleeves 48. Washers 49, of resilient material, such as rubber, are provided on the nipples for engagement with the contiguous portions of the exterior of the pipe section 10 upon tightening of the sleeves 48, thus providing fluid tight joints at these locations.

The alined ribs 31 and 32 are provided with a passageway 50 extending therethrough and connecting the nipples 40 and 41, and at the front end thereof a plurality of pressure openings 51 are provided for ascertaining the pressure effective in the interior of the pipe section 10, upstream from the venturi throat 22. The nipple 42 is in communication with a passageway 52 having a branch 53 extending to the interior chamber 28.

The nipple 43 is in communication with a passageway 55 formed in the body which in turn is connected to a circumferentially extending passageway 56 between the ring 14 and the body portion 15, and a plurality of pressure holes 57 are provided extending radially through the ring 14 and communicating with the venturi throat 22.

The nipple 41 is preferably connected by a pipe 60 to a suitable instrument (not shown) for indicating, recording, or controlling.

The body portion 13 is provided with a plurality of openings 59 for providing communication between the interior chamber 28 and the inner face of the resilient ring 37.

The nipple 43 is preferably connected by a fluid conduit 63 of any desired length to a flexible metallic bellows 64 which is supported at one end by an abutment 65 formed on a supporting frame 66, the bellows 64 having an actuating abutment 67 at the other end for engagement with a lever 68. The conduit 63 may have a pipe 69 connected thereto and leading to the same instrument (not shown), to which the pipe 60 is connected.

Opposed to the bellows 64, another flexible metallic bellows 70 is provided, supported at one end by an abutment 71, on the supporting frame 66, and having the other end provided with an actuating abutment 72 for engagement with the lever 68. The interior of the bellows 70 is preferably connected by a fluid conductor 73 to the nipple 40.

The lever 68 is preferably mounted on the frame 66 in any desired manner but may be supported by a thin metallic plate 74 which serves as a fulcrum and may also have, if desired, a predetermined restoring effect on the lever 68. In order to provide a predetermined loading on the lever 68 in opposition to the predominant force applied by the bellows 70, a flexible metallic bellows 75 may be provided, supported at one end by an abutment 76, carried on the frame 66, and having an actuating abutment 77 at the other end in engagement with the lever 68. The interior of the bellows 75 is preferably connected by a pipe 78 to a suitable source of controlled or regulated pressure (not shown) for determining the loading applied on the lever 68.

If desired, as an alternative for or addition to the bellows 75, a movable weight 80 may be employed on the lever 68 to determine the loading.

The lever 68 is adapted to actuate a pilot valve 85 which has an inlet connection 86 from a source of pressure fluid, such as air (not shown), a discharge or bleed connection 87, and a fluid delivery connection or pipe 88 extending to the nipple 42. The pilot valve 85 is preferably of the supply and waste type for determining, by its positioning, the pressure of the fluid made available through the pipe 88.

The mode of operation will now be pointed out.

Fluid under pressure and at the desired pressure level is supplied to the bellows 75 and is effective on the lever 68, or the weight 80 is adjusted to the desired position, or both adjustments are made, to determine the loading. The upstream pressure of the fluid flowing through the pipe section 10 towards the body 11 is effective through the openings 51, the passageway 50 and the fluid conductor 73 to the interior of the bellows 70 and against the lever 68. The pressure at the venturi throat 22 is effective through the openings 57, the passageway 56, the passageway 55, the conduit 63 and in the bellows 64, in opposition to the pressure in the bellows 70.

Fluid under pressure is also supplied to the pilot valve 85. The forces applied on the lever 68 are effective for positioning the pilot valve 85 for applying fluid under pressure through the fluid delivery connection 88, the passageways 52, and 53, in the interior space 28 and through the openings 59 against the interior face of the ring 37. The ring 37 is expanded to an extent determined by the pressure applied thereagainst from the interior and by its positioning with respect to the inner wall of the pipe section 10 determines the aperture or opening through which fluid may be delivered.

At any stage of closing, the flowing fluid bears against the ring 37, tending to force it inwardly. The tangential tension in the ring 37 also tends to force it inwardly if it is not held by the actuating pressure applied through the openings 59.

As the ring 37 is moved to various positions the pressure loss produced by its throttling action results in various pressure intensities acting on the toroidal downstream surface of the ring 37. Whatever the value of this pressure, its direction is radial with respect to the hinge point of the central section 37a, which hinge point is located in the annular part 37c, thus the equilibrium of the ring 37 is not disturbed by varying downstream pressure.

For a predetermined rate of flow there will be established a condition of equilibrium. For such condition the lever 68 will be in a position of equilibrium, and will position the pilot valve 85 to maintain a sufficient fluid pressure effective through the fluid connection 88 to the space 28 to hold the pressure in the space 28 at a fixed level. This pressure is effective in the interior space 28 and against the ring 37 to maintain the rate of flow through the pipe section 10 and past the venturi throat 22 and the tube 37 at a value determined by the loading of the lever 68 by the bellows 75 or the weight 80, or both.

Upon any change in the rate of flow, the resulting differential pressure effective in the bellows 64 and 70 is changed, in the same manner, i. e. increasing or decreasing, thus changing the pressure in the interior chamber 28 and moving the ring 37 to a position to restore the rate of flow to the prescribed value. Upon a change in the positioning of the resilient ring 37, there will, of course, be a change in flow, thereby producing a change in the pressure differential between the pressure applied by the bellows 64 and 70. This change in the differential of the pressure effective in the bellows 64 and 70 is effective on the lever 68, and, with the loading force on the lever 68, is effective for restoring the condition of equilibrium and correcting any departure of the flow from the prescribed value.

The rate of flow through the pipe section 10 may, of course, be varied as desired by varying the loading effected by the bellows 75 or the weight 80, or both.

It will be noted that the exterior surface of the body portion 13 is such that when the ring 37 is completely collapsed thereagainst, a substantially smooth continuous curve is provided with the exterior surface 21 of the ring 14 and the exterior surface 16 of the body portion 12. A gradually increasing passageway is accordingly provided beyond a venturi throat 22, thus reducing the overall head loss in the wide open position.

It will also be noted that the pipe section 10 and body 11, although shown with their axes horizontal, could be operated in any other desired position, by suitable positioning of the frame 66 and the lever 68, with the lever preferably horizontal.

I claim:

1. In a fluid flow controller, a tubular fluid flow conduit, a body member in said conduit and spaced therefrom and providing with said conduit an annular restricted flow passageway with a communicating annular diverging passageway therebeyond, a pressure connection to said conduit upstream with respect to said body member and a pressure connection to said restricted flow passageway, an annular radially outwardly expansible member of resilient material on said body member in said diverging passageway and movable with respect to said passageway for controlling the flow through said conduit, said expansible member having an upstream hinged supporting connection to said body member, a flexible downstream tubular connecting member interposed between said body member and said expansible member, a connection to a source of pressure fluid, and members connected to said pressure connections and to the connection to said source for supplying fluid from said source to the interior of said expansible member for determining the expansion of said expansible member.

2. In a fluid flow controller, a tubular fluid flow conduit, a body member in said conduit and spaced therefrom and providing with said conduit an annular restricted flow passageway with a communicating annular diverging passageway therebeyond, a pressure connection to said conduit upstream with respect to said body member and a pressure connection to said restricted flow passageway, an annular radially outwardly expansible member of resilient material on said body member in said diverging passageway and movable with respect to said pasasgeway for controlling the flow through said conduit, said expansible member having an upstream hinged connection to said body member, a flexible downstream tubular connecting sleeve interposed between said body member and said expansible member, a source of pressure fluid, and members connected to said pressure connections for supplying fluid from said source to the interior of said expansible member for determining the expansion of said expansible member.

3. In a fluid flow controller, a tubular fluid flow conduit, a body member mounted interiorly in said conduit and spaced therefrom and providing with said conduit an annular restricted flow passageway with a communicating diverging passageway therebeyond, a pressure connection to said conduit upstream with respect to said body member and a pressure connection to said restricted flow passageway, a radially outwardly expansible member carried by and extending around said body member at the diverging passageway and movable with respect to said passageway for controlling the flow through said conduit, said expansible member having a hinge connection to said body member, a flexible downstream tubular longitudinally reinforced sleeve interposed between said body member and said expansible member, a connection to a source of pressure fluid, and members connected to said pressure connections and to the connection to said source for supplying fluid from said source to the interior of said expansible member for determining the expansion of said expansible member.

4. In a fluid flow controller, a tubular fluid flow conduit, a body member mounted interiorly in said conduit and spaced therefrom and providing with said conduit an annular restricted flow passageway with a communicating diverging passageway therebeyond, a pressure connection to said conduit upstream with respect to said body member and a pressure connection to said restricted flow passageway, a radially outwardly expansible member carried by and extending around said body member at the diverging passageway and movable with respect to said passageway for controlling the flow through said conduit, said expansible member having a hinge connection at its upstream portion with said body member a flexible downstream tubular connecting sleeve folded on itself and interposed between said body member and said expansible member and having portions movable from engagement with said body member into engagement with said expansible member, a connection to a source of pressure fluid, and members connected to said pressure connections and to the connection to said source for supplying fluid from said source to the interior of said expansible member for determining the expansion of said expansible member.

5. In a fluid flow controller, a tubular fluid flow conduit, a body member in said conduit and spaced therefrom and providing with said conduit an annular flow passageway, an annular expansible member having an edge portion hingedly connected to said body member, said expansible member being radially outwardly movable for determining the flow through said conduit, and the downstream portion of said expansible member being connected to said body member by a longitudinally reinforced flexible sleeve.

6. In a fluid flow controller, a tubular fluid flow conduit, a body member in said conduit and spaced therefrom and providing with said conduit an annular flow passageway, an annular expansible member having an edge portion hingedly connected to said body member, said expansible member being radially outwardly movable for determining the flow through said conduit, and the downstream portion of said expansible member being connected to said body member by a flexible folded section in rolling contact with said body member.

7. In a fluid flow controller, a tubular fluid flow conduit, a body member mounted interiorly in said conduit in spaced relation thereto and providing with said conduit an annular flow passageway, a radially outwardly expansible member carried by and extending around said body member, said expansible member being movable in said passageway for controlling the flow through said conduit, said expansible member having a hinge connection with said body member, said expansible member having a central portion of substantially quadrant shape in radial axial cross section, and said expansible member having an expansible connection to said body member.

8. In a fluid flow controller, a tubular fluid flow conduit, a body member mounted interiorly in said conduit in spaced relation thereto and providing with said conduit an annular flow passageway, a radially outwardly expansible member carried by and extending around said body member, said expansible member being movable in said passageway for controlling the flow through said conduit, said expansible member having a hinge connection with said body member and an expansible connection to said body member, said expansible member having a central portion of substantially quadrant shape in radial axial cross section, and said expansible member having radial axial reinforcing cords therein.

9. In a fluid flow controller, a tubular fluid flow conduit, a body member mounted interiorly in said conduit in spaced relation thereto and providing with said conduit an annular flow passageway, a radially outwardly expansible member carried by and extending around said body member, said expansible member being movable in said passageway for controlling the flow through said conduit, said expansible member having a hinge connection with said body member, said expansible member having a central portion of substantially quadrant shape in radial axial cross section, said expansible member having an expansible connection to said body member, and a coil spring disposed circumferentially within said expansible member.

10. In a fluid flow controller, a tubular fluid flow conduit, a body member mounted interiorly in said conduit in spaced relation thereto and providing with said conduit an annular flow passageway, a radially outwardly expansible member carried by and extending around said body member, said expansible member being movable in said passageway for controlling the flow through said conduit, said expansible member having a hinge connection with said body member, said expansible member having radial axial reinforcing members therein, and a continuous circumferentially disposed expansible reinforcing member within said expansible member.

11. In a fluid flow controller, a tubular flow conduit, a hollow body member in said conduit and spaced therefrom and providing with said conduit a restricted flow passageway, mounting members for said body member, a pressure detecting fluid passageway in one of said mounting members in communication with said restricted passageways, a second pressure detecting fluid passageway in one of said mounting members in communication with said fluid conduit upstream with respect to said body, pressure responsive members in communication with said detecting passageway, an annular resilient expansible member carried on said body member and movable with respect to the interior of said conduit for determining the flow through said conduit, fluid connections between the interior face of said expansible member and the interior of said body member, and means controlled by said pressure responsive members for controlling the pressure in said body and applied interiorly against said expansible member.

12. In a fluid flow controller, a tubular flow conduit, a hollow body member in said conduit and spaced therefrom and providing with said conduit a restricted flow passageway, mounting members for said body member, a pressure detecting fluid passageway in one of said mounting members in communication with said restricted passageway, a pressure responsive member with which said fluid passageway is in communication, a second pressure detecting fluid passageway in one of said mounting members in communication with said fluid conduit upstream with respect to said body, a second pressure responsive member in communication with said second detecting passageway, an annular resilient expansible member carried on said body member beyond said restricted passageway and movable with respect to the interior of said conduit for determining the flow through said conduit, fluid connections between the interior face of said expansible member and the interior of said body member, and means controlled by said pressure responsive members for controlling the pressure in said body and applied interiorly against said expansible member.

13. In a fluid flow controller, a tubular fluid flow conduit, a body member in said conduit and spaced therefrom and providing with said conduit an annular restricted flow passageway with a communicating annular diverging passageway therebeyond, a pressure connection to said conduit upstream with respect to said body member and a pressure connection to said restricted flow passageway, an annular outwardly expansible member on said body member in said diverging passageway and movable with respect to the interior of said conduit for controlling the flow through said conduit, recesses in said body member for the reception of portions of said expansible member, locking flanges on said body member for securing said expansible member in position in said recesses, a source of pressure fluid, and members connected to said pressure connections for supplying fluid from said source to the interior of said expansible member for determining the expansion of said expansible member.

14. In a fluid flow controller, a tubular fluid flow conduit, a body member in said conduit and spaced therefrom and providing with said conduit an annular restricted flow passageway, with a communicating annular diverging passageway therebeyond, a pressure connection to said conduit upstream with respect to said body member and a pressure connection to said restricted flow passageway, a tubular outwardly expansible member on said body member in said diverging passageway and movable with respect to the interior of said conduit for determining the flow through said conduit, locking members on said body member for securing the ends of said tubular member in position, a source of pressure fluid, and members connected to said pressure connections for supplying fluid from said source to the interior of said expansible member for determining the expansion of said expansible member.

15. In a fluid flow controller, a fluid flow conduit having therein a member providing with said conduit an annular venturi throat with a communicating annular diverging recovery passageway therebeyond, an annular radially outwardly expansible member mounted in said recovery passageway on said first member at the discharge end of said throat and movable with respect to the interior of said conduit for determining the flow through said conduit, an upstream pressure connection to said conduit and a pressure connection to said throat, a source of pressure fluid, and members connected to said pressure connections for supplying fluid from said source to the interior of said expansible member for determining the expansion of said expansible member.

16. In a fluid flow controller, a fluid flow conduit having an interior cylindrical surface, a body member concentrically mounted interiorly in said conduit and spaced inwardly from said surface and providing with said conduit a restricted annular flow passageway, said body member having a portion extending downstream beyond said passageway, a pressure connection to said conduit upstream with respect to said body member and a pressure connection to said passageway, an annular radially outwardly expansible member carried by said downstream portion of said body member and beyond the discharge end of said passageway, a source of pressure fluid, and members connected to said pressure connections for supplying fluid from said source to the interior of said expansible member for determining the expansion of said expansible member.

References Cited in the file of this patent

UNITED STATES PATENTS

| | | |
|---|---|---|
| 1,550,717 | Tawle | Aug. 25, 1925 |
| 1,834,870 | Rogers | Dec. 1, 1931 |
| 1,873,138 | Mitchell | May 23, 1932 |
| 1,936,650 | Wade | Nov. 28, 1933 |
| 1,990,309 | Phillips | Feb. 5, 1935 |
| 2,247,363 | Dunn | July 1, 1941 |
| 2,283,835 | Weaver | May 19, 1942 |
| 2,336,450 | Voorhess | Dec. 7, 1943 |
| 2,446,571 | Browne | Aug. 10, 1948 |
| 2,470,744 | Korn | May 17, 1949 |
| 2,608,204 | Dunn | Aug. 26, 1952 |

FOREIGN PATENTS

| | | |
|---|---|---|
| 75,464 | Norway | 1949 |